US012595700B2

(12) United States Patent
Wolfe et al.

(10) Patent No.: US 12,595,700 B2
(45) Date of Patent: Apr. 7, 2026

(54) METHOD AND APPARATUS FOR ADJUSTING THE OPENING SPEED AND TORQUE OF A DOOR WITH A DOOR OPERATOR

(71) Applicant: Schlage Lock Company LLC, Carmel, IN (US)

(72) Inventors: John A. Wolfe, Cicero, IN (US); Jake E. Meckley, Kannapolis, NC (US)

(73) Assignee: Schlage Lock Company LLC, Carmel, IN (US)

( * ) Notice: Subject to any disclaimer, the term of this patent is extended or adjusted under 35 U.S.C. 154(b) by 162 days.

(21) Appl. No.: 18/402,205

(22) Filed: Jan. 2, 2024

(65) Prior Publication Data

US 2025/0215739 A1 Jul. 3, 2025

(51) Int. Cl.

| | |
|---|---|
| ***H02K 15/00*** | (2025.01) |
| ***E05F 15/63*** | (2015.01) |
| ***E05F 15/75*** | (2015.01) |

(52) U.S. Cl.

CPC .............. *E05F 15/75* (2015.01); *E05F 15/63* (2015.01); *E05Y 2400/31* (2013.01); *E05Y 2400/36* (2013.01); *E05Y 2900/132* (2013.01)

(58) Field of Classification Search

CPC ...... E05F 15/75; E05F 15/63; E05Y 2400/31; E05Y 2400/36; E05Y 2900/132; H02P 3/00; H02P 7/00; H02P 21/00; H02M 1/00

See application file for complete search history.

(56) References Cited

U.S. PATENT DOCUMENTS

| | | | | |
|---|---|---|---|---|
| 9,868,340 | B2 | 1/2018 | Nishikibe et al. | |
| 10,208,520 | B2 | 2/2019 | Long et al. | |
| 10,316,568 | B2 | 6/2019 | Langenberg et al. | |
| 10,480,236 | B2 | 11/2019 | Soderqvist | |
| 10,876,346 | B2 | 12/2020 | Hucker et al. | |
| 11,072,965 | B2 | 7/2021 | Soderqvist | |
| 11,536,075 | B2 | 12/2022 | Soderqvist | |
| 2009/0265992 | A1 | 10/2009 | Hass et al. | |
| 2013/0118079 | A1 * | 5/2013 | Yulkowski .............. | E05F 15/70 49/31 |
| 2015/0059249 | A1 | 3/2015 | Yulkowski | |
| 2021/0180389 | A1 | 6/2021 | Plummer et al. | |
| 2021/0372191 | A1 | 12/2021 | Langenberg et al. | |
| 2023/0031967 | A1 | 2/2023 | Wolfe | |

FOREIGN PATENT DOCUMENTS

| | | |
|---|---|---|
| JP | 2002242533 A | 8/2002 |

OTHER PUBLICATIONS

International Search Report; ISA/US; International Application No. PCT/US2025/010095; May 5, 2025; 2 pages.
Written Opinion of the International Searching Authority; ISA/US; International Application No. PCT/US2025/010095; May 5, 2025; 6 pages.

* cited by examiner

*Primary Examiner* — Muhammad S Islam
(74) *Attorney, Agent, or Firm* — Taft Stettinius & Hollister LLP

(57) ABSTRACT

A door is coupled to a door operator assembly that includes a motor operable in a first mode of operation to open the door at a pre-defined speed. The first mode of operation is overridden in response to an output of the motor reaching a minimum threshold due to a force applied to the door. In the second mode of operation, the output of the motor is adjusted to assist manual opening of the door.

20 Claims, 2 Drawing Sheets

METHOD AND APPARATUS FOR ADJUSTING THE OPENING SPEED AND TORQUE OF A DOOR WITH A DOOR OPERATOR

FIELD OF THE INVENTION

The present disclosure generally relates to a door and a door operator, and more particularly to a door operator configured to open the door in a controlled manner.

BACKGROUND

Door operators are configured to move a door from an open position to a closed position under control of a spring mechanism, a motor, a valve, or other actuators. Some door operators include a motor that is electrically powered to open the door automatically from closed to full open based on a signal from a sensor or if the user begins pushing on the door. In this mode the door will open at a pre-defined speed which may be configured to be relatively slow for safety purposes in the cases of children or the elderly and to meet BHMA 156.19 standards. Other door operators include a feature to assist the user as they manually open the door. This feature will make the door feel lighter.

If the user seeks to open the door at a speed faster than the pre-defined speed set by the motor, the user will push on the door to manually override the pre-defined speed to open the door. As the speed of the door increases due to the manual force applied by the user, the user bears more of the force required to open the door. If enough force is applied by the user, opening of the door at the desired speed can cause the motor to become back driven, causing additional braking and resistance to opening of the door. Variable and/or surprising resistance to opening of the door can result in an unpleasant experience for the user. There is a need, therefore, for further improvements in the operation and control of automatic door operators.

SUMMARY

As described herein, a system and method is provided for a door with a motor-driven door operator that assists in opening the door. The motor is actively controlled during opening of the door. For example, during opening of the door, the output of the motor is controlled in a first mode to open the door at a pre-defined speed unless an output of the motor force is reduced below a minimum threshold required to maintain the pre-defined speed. The output of the motor is then controlled in a second mode to maintain a constant or pre-defined force profile to assist the user in manually opening the door until door is again slowed to the pre-defined speed.

In one embodiment, there is provided a method for adjusting the opening speed of a door coupled to a door operator assembly having a motor that assists in opening the door. The method includes: initiating movement of the door from a closed position toward an open position; operating the motor to open the door at a predefined speed in response to initiating the movement; determining an output of the motor has reached a minimum threshold output force associated with the predefined speed while opening the door; and in response to the determining, adjusting the output of the motor to assist a manual force applied to the door during the opening that opens the door at a speed greater than the pre-defined speed.

In another embodiment, there is provided a system for adjusting the opening of a door coupled to a door operator assembly having a motor and a controller configured to control the motor during movement of the door from a closed position to an open position. The controller is configured to control the motor to open the door at a pre-defined speed from the closed position to the open position. In response to the motor output falling to or below a minimum threshold output force during the opening, control the output of the motor to assist a manual force that is applied to open the door at a speed greater than the predefined speed.

Further embodiments, forms, features, and aspects of the present application shall become apparent from the description and figures provided herewith

DETAILED DESCRIPTION

Figure 1:
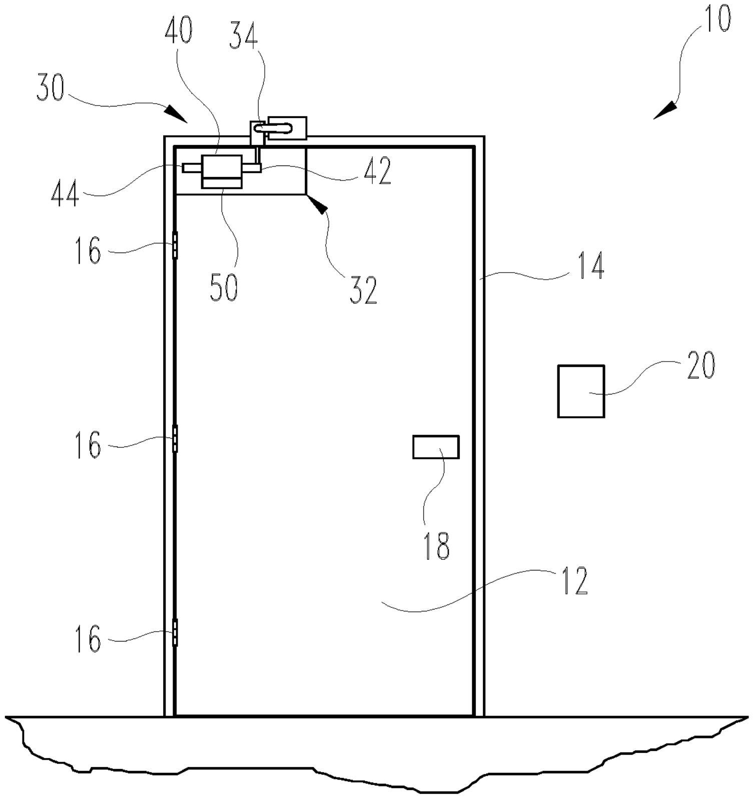
FIG. 1 is a schematic elevation view of a door operator assembly coupled to a door and to a door frame.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

FIG. 1 illustrates a system 10 that includes a door 12, a frame 14, and a door operator assembly 30 operable to mechanically move door 12 from a closed position to an open position. In an embodiment, door 12 is pivotally mounted to frame 14 with one or more hinges 16. In an embodiment, door 12 includes an on-door actuator 18 operable to open door 12. On-door actuator 18 can be a lever, knob, pushbar, push pad, button, sensor or any other suitable device. However, embodiments without an on-door actuator 18 are also contemplated. In addition, embodiments with an off-door actuator 20 that is remote from door 12 are also contemplated, such as may be employed in handicap or disabled person access devices. Off-door actuator 20 may be a push button, plate, sensor, or other device that is manually moved or senses a user's approach to initiate automatic door opening.

Door operator assembly 30 includes an operator housing 32 and an arm assembly 34 connected between the operator housing 32 and the frame 14. The housing 32 is mounted on the door 12, and the arm assembly 34 is connected between the body 32 and the door frame 14. In other embodiments, the housing 32 may be mounted on the frame 14, and the arm assembly 34 may be connected between the housing 32 and the door 12.

Figure 2:
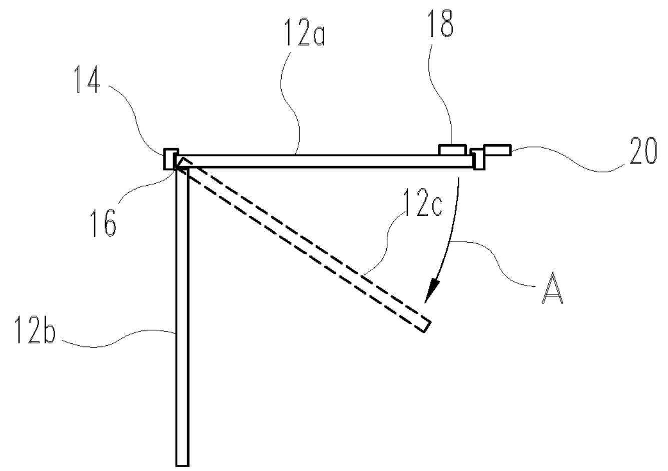
FIG. 2 is a schematic view showing the door of FIG. 1 opening from a closed position to an open position.

Door operator assembly 30 further includes a motor 40 positioned within housing 32. Motor 40 is operably connected to arm assembly 34. In an embodiment, motor 40 is an electric motor whose operation is controlled by a controller 50 positioned in housing 32. Referring further to FIG. 2, motor 40 is operable in response to one or more inputs to move door 12 in the direction A about hinges 16 from the closed position 12*a* to the open position 12*b*. The one or more inputs can be received from, for example, on-door actuator 18, off-door actuator 20, and/or by a user manually pushing on door 12 in the direction A.

Operator housing 32 can include an interior space configured to house all or a part of various internal components of the door operator assembly 30, such as motor 40, a drive mechanism 42, a biasing member 44, and/or controller 50. Drive mechanism 42 can connect motor 40 to arm assembly 34. For example, drive mechanism 42 can include a rotatable pinion and a rack drivingly engaged with the pinion. Other embodiments contemplate any suitable mechanism for driving door 12 to an open position using motor 40.

The biasing member 44 can be a spring or other bias element engaged with the drive mechanism 42 to bias door 12 to a closed position. In an embodiment, biasing member 44 provides resistance to opening of door 12 that is overcome by motor 40 and/or manual force. In an embodiment, the resistance provided by biasing member increases as door 12 is moved in the direction A.

The arm assembly 34 generally includes at least one arm coupled to drive mechanism 42 and a second arm coupled between the first arm and the door 12 or frame 14. In an embodiment, arm assembly 34 is configured as a scissors-type arm assembly. It is also contemplated that the arm assembly may include a single arm, with one end coupled to motor 40 and a second end slidably mounted in a track mounted on the door 12 or the door frame 14. Other embodiments contemplate any suitable arm assembly, actuator, opener, or other arrangement connected between door 12 and frame 14 that is configured to open door 12 about hinges 16.

Figure 3:
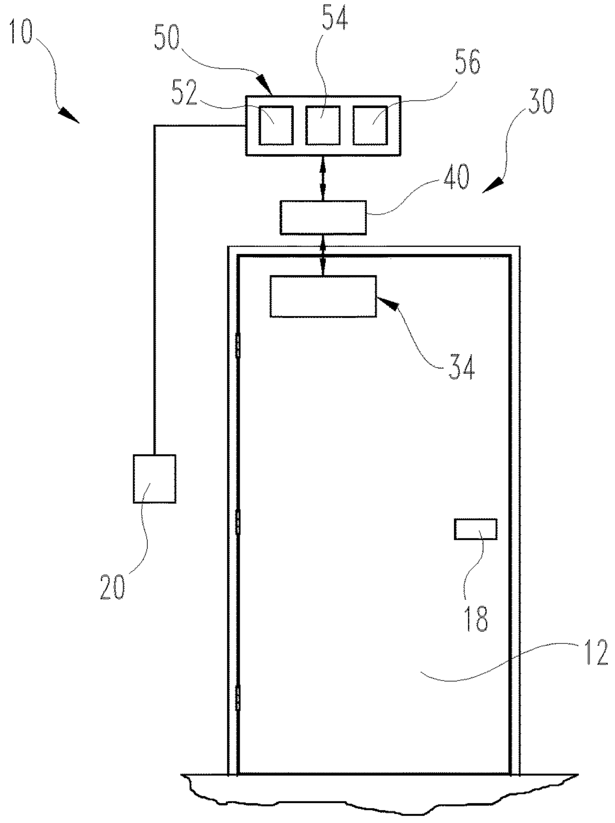
FIG. 3 is a schematic block diagram of selected components of the door operator assembly and door illustrated in FIG. 1.

Referring to FIG. 3, the controller 50 is in communication with the motor 40, and may further be in communication with an input mechanism, such as on-door actuator 18 or off-door actuator 20. As illustrated, the controller 50 includes a processor 52, an actuation unit 54, and a memory 56. As described in further detail below, the actuation unit 54 is configured to activate the motor 40 and/or to receive inputs from motor 40, drive mechanism 42, and/or a sensor (not shown) to evaluate one or more parameters associated with opening door 12.

The memory 56 is a non-transitory computer readable medium having data stored thereon, and is in communication with the processor 52. The data stored on the memory 56 may include, for example, one or more sets of instructions, one or more look-up tables, and/or additional data. The instructions may be executed by the processor 52 to cause the processor 52 to perform one or more functions such as, for example, the function of opening door 12 with actuation unit 54. While the controller 50 may be housed within the operator housing 32, it is also contemplated that the controller 50 may be positioned elsewhere on the door operator assembly 30 or externally to the door operator assembly 30.

The processor 52, in different embodiments, is a programmable type, a dedicated, hardwired state machine, or a combination of these, and can further include multiple processors, Arithmetic-Logic Units (ALUs), Central Processing Units (CPUs), Digital Signal Processors (DSPs) or the like. Other forms of processor 52 include multiple processing units, distributed, pipelined, and/or parallel processing. The processor 52 may be dedicated to performance of the operations described herein or may be utilized in one or more additional applications. In the depicted form, the processor 52 is of a programmable variety that executes algorithms and processes data in accordance with defined by programmed instructions (such as software or firmware) stored in memory 56. Alternatively or additionally, the operating logic for processor 52 is at least partially defined by hardwired logic or other hardware. The processor 52, in different embodiments, is comprised of one or more components of any type suitable to process the signals received from input/output devices, and provide desired output signals. Such components may include digital circuitry, analog circuitry, or a combination of both.

The memory 56 includes one or more types, such as a solid-state variety, electromagnetic variety, optical variety, or a combination of these forms. Furthermore, the memory 56 includes, in different embodiments, volatile, nonvolatile, or a combination of these types, and a portable variety, such as a disk, tape, memory stick, cartridge, or the like. In addition, the memory 56 is configured to store data that is manipulated by the operating logic of the processor 52, such as data representative of signals received from and/or sent to the door operator in addition to or in lieu of stored program instructions, just to name one example.

The actuation unit 54 is configured to operate in a first mode of operation and a second mode of operation in response to one or commands from processor 52. In the first mode of operation, the output of motor 40 is regulated by actuation unit 54 to control the angular speed of the door 12 at a pre-defined speed during opening events. In the second mode of operation, the actuation unit 54 is configured to regulate the output of motor 40 to control the amount of assistance motor 40 provides in opening the door 12. The amount of assistance provided may vary in response to an actual manual force applied to the door 12 by the user while opening the door in the direction A.

As will be appreciated by the description herein, the techniques described herein relating to door opening control can be implemented in controller 50, which may include one or more controllers for controlling different aspects of the system 10. In one form, the controller 50 comprises one or more electronic control units or electronic control modules. In addition, any other suitable sensors and their associated parameters may be encompassed by the system and methods disclosed herein. Accordingly, the sensors may include any suitable device used to sense any relevant physical parameters including electrical and mechanical parameters of system 10. As used herein, the term sensors may include any suitable hardware and/or software used to sense or estimate any door system parameter and/or various combinations of such parameters either directly or indirectly.

As shown in FIG. 2, the door 12 moves in the direction A from the closed position 12*a* to one or more intermediate positions 12*c*, then to the open position 12*b*. The door 12 has a range of positions between closed position 12*a*, intermediate position 12*c*, and open position 12*b*. As will be appreciated, the arm assembly 34 has a plurality of arm positions each of which correspond to one of the door positions. The force required from motor 40 to open the door may vary along the path of travel depending on the angular position of the door 12 between the closed and open positions, the weight of door 12, the kinematics of arm assembly 34 in those positions, the resistance provided by biasing member 44, and other factors such as friction, wind, etc.

In order to control the opening of door 12, controller 50 can be configured to learn the force required from motor 40 along the range of positions of door 12 to maintain a predefined speed along the range of positions for opening door 12 from closed position 12*a* to open position 12*b*. In another embodiment, controller 50 is pre-programmed based on the design of door 12 so that motor 40 applies the desired opening force based on the angular position of door 12 between closed position 12*a* and open position 12*b*. For example, the controller 50 can be programmed to apply a fixed force at all door angles, or a force that varies based on the door angle to compensate for increasing resistance of a door spring.

The force (or torque) being applied to open door 12 can be measured by monitoring the current that flows through the motor 40 during opening since current is directly proportional to motor force. When a user begins to push on the door 12, or actuates on-door actuator 18 or off-door actuator 20, this will initiate opening in a first mode of operation in which motor 40 begins opening door 12 at a predefined speed.

If the user then begins to push the door 12 slightly faster than the predefined speed, the controller 50 will automatically reduce the motor force (thus motor current) output to attempt to maintain the door 12 at the predefined speed. As the user continues to push door 12 increasingly faster, the user takes on a greater amount of the overall opening force needed to open the door 12, and the motor 40 takes on less opening force.

Once the motor force or current from motor 40 reaches a predefined minimum or low threshold value during opening of door 12, the controller 50 will momentarily disable the first mode of operation with speed control, and transition to a second mode of operation in which motor 40 assists the user in opening door 12 rather than attempting to maintain the pre-defined speed. While the user pushes door 12 with a force sufficient to keep the door moving faster than the pre-defined speed, motor 40 is controlled to assist the user in opening the door 12.

As the user further pushes on the door 12, the controller 50 will monitor the current of motor 40 and continue to dynamically adjust the motor force of motor 40 to keep the user's overall effort or force relatively constant while opening the door 12. This dynamic adjustment includes adjusting for the increasing opposing force of the biasing member 44 as it resists opening of the door 12, such as by compressing. In addition, the dynamic adjustment accounts for the kinematics and leverages of the arm assembly 34 during opening. Additionally, as the door speed further increases, the back electromagnetic fields of the motor 40 increase, and the dynamic adjustment of motor 40 during opening of door 12 requires an increasing voltage to be applied to the motor 40 in order to maintain targeted force or motor current to continue to assist the user in opening door 12.

The controller 50 of door operator assembly 30 controls motor 40 so the force the user exerts on the door 12 is constant, or matched to a predetermined force profile. As the user reduces the force exerted on the door 12, the door 12 will slow down. Once the door 12 reaches its predefined speed employed during the first mode of operation, control of door 12 is reverted to the first mode of operation so that the motor 40 continues to open the door 12 at the predefined speed for the remaining distance until the door 12 is fully opened.

Figure 4:
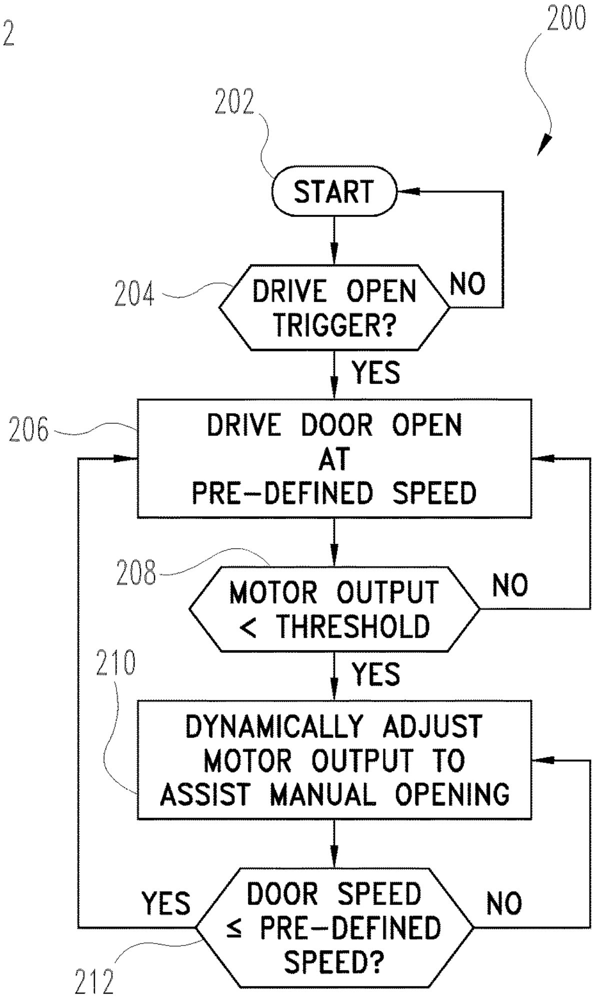
FIG. 4 is a block diagram of a process to open the door with the door operator assembly.

With reference to FIG. 4, there is illustrated a flow diagram of a process 200 for controlling the opening of door 12 with controller 50. Process 200 may be implemented in and performed by one or more components of an electronic control system such as one or more electronic control units (e.g., controller 50 and/or other electronic control units) and/or by other electronic control system components.

Process 200 begins at start operation 202 and proceeds to conditional 204, which determines if door 12 opening is being initiated through a drive open trigger, such as actuator 18, sensor 20, and/or manual pushing on door 12. If conditional 204 is NO, process returns to operation 202. If conditional 204 is YES, process continues at operation 206 in a first mode of operation to drive door 12 toward the open position at a pre-defined speed with motor 40. In an embodiment, the output of motor 40 is controlled by controller 50 to open door 12 at the pre-defined based on learned or programmed motor outputs that maintain the pre-defined speed regardless of the angular position of door 12.

During operation 206, process 200 continues at conditional 208. Conditional 208 determines if the output from motor 40 is at or below a predefined minimum threshold force associated with the pre-defined speed. For example, if the motor force or motor current is compared with a learned or programmed minimum threshold force for opening door 12 at the pre-defined speed. If conditional 208 is NO, process 200 returns to operation 206 to continue to open door 12 at the pre-defined speed until the open position 12*b* is reached.

If conditional 208 is YES, process 200 continues at operation 210 since the affirmative to conditional 208 is indicative of a user pushing door 12 to open at a speed faster than the pre-defined speed. Operation 210 is a second mode of operation that dynamically adjusts the motor force or output from motor 40 to provide assistance to the user manually opening door 12 at the faster speed so that the user does not bear the entire weight and resistance of door 12. In an embodiment, the output of motor 40 is controlled so the force exerted by the user to open the door is a constant or substantially constant force. In an embodiment, the output of motor 40 is controlled so the force exerted by the user to open door 12 follows a predetermined force profile that varies based on the angular position of door 12. For example, the force may increase toward the open position to prevent or reduce the door speed as it approaches the open position 12*b*.

During operation 210, process 200 continues at conditional 212. Conditional 212 determines if the door speed is at or less than the predefined speed used in the first mode of operation 204. If conditional 212 is NO, process 200 returns to operation 210 to continue to open door 12 providing user assistance with motor 40 until the door reaches the open position 12*b*. If conditional 212 is YES, process 200 reverts to the first mode of operation 204 to open door 12 at the pre-defined speed until the open position 12*b* is reached.

In an embodiment, controller 50 is configured to perform process 200. In an embodiment, controller 50 is configured to control the motor 40 to open the door 12 at a predefined speed from the closed position to the open position; determine an output of the motor 40 during opening the door 12; and, in response to the motor 40 output falling to or below a minimum threshold during the opening, control the output of the motor 40 to assist a manual force that is applied to open the door 12 at a speed greater than the predefined speed.

Various aspects of the present disclosure are contemplated. According to one aspect, a method for opening a door coupled to a door operator assembly having a motor is provided. The method includes initiating movement of the door from a closed position toward an open position; operating the motor to open the door at a predefined speed in response to initiating the movement; determining an output of the motor has reached a minimum threshold output associated with the predefined speed while opening the door; and in response to the determining, adjusting the output of the motor to assist a manual force applied to the door during the opening that opens the door at a speed greater than the pre-defined speed.

In an embodiment, the output of the motor is a force applied by the motor to the door operator. In a further embodiment, the force applied by the motor is determined by a motor current.

In an embodiment, after the output of the motor reaches the minimum threshold output, an opening speed of the door is greater than the predefined speed.

In an embodiment, in response to the determining, the output of the motor is adjusted so the manual force required to open the door by a user during opening is a constant force.

In an embodiment, in response to the determining, the output of the motor is adjusted so the manual force required to open the door by a user during opening follows a predetermined force profile.

In an embodiment, the method includes reverting to operating the motor to open the door at the predefined speed in response to the speed of the door falling to or below the pre-defined speed.

In an embodiment, the motor operates in a first mode to open the door at the predefined speed, and the motor operates in a second mode to open the door in response to the manual force applied to the door. In a further embodiment, the first mode moves the door from the closed position to the open position at the predefined speed unless the output of the motor reaches the minimum threshold output.

According to another aspect of the disclosure, a system for opening a door mounted to a frame is provided. The system includes door operator connectable between the door and the frame and a motor operable to drive the door operator to move the door from a closed position to an open position. The system also includes a controller connected to the motor. The controller is configured to control the motor to open the door at a predefined speed from the closed position to the open position; determine an output of the motor during opening the door; and in response to the motor output falling to or below a minimum threshold during the opening, control the output of the motor to assist a manual force that is applied to open the door at a speed greater than the predefined speed.

In an embodiment, the controller is configured to control the motor to open the door in response to a trigger from at least one of a sensor, an actuator, and a user pushing on the door.

In an embodiment, the door operator includes an arm assembly connectable to at least one of the door and the frame, and a drive mechanism that connects the motor to the arm assembly.

In an embodiment, the output of the motor is a force applied by the motor to the door operator. In a further embodiment, the force applied by the motor is determined by a current of the motor.

In an embodiment, the controller is configured to control the output of the motor so that the manual force that is being applied to open the door at the speed greater than the predefined speed is constant.

In an embodiment, the controller is configured to control the output of the motor so that the manual force that is being applied to open the door at the speed greater than the predefined speed follows a predetermined profile.

In an embodiment, the controller is configured to operate the motor to open the door at the predefined speed in response to the speed of the door decreasing to or below the pre-defined speed.

In an embodiment, the controller is configured to learn the output required from the motor at various door angles between the closed position and the open position while opening the door at the predefined speed. In an embodiment, the controller is pre-programmed to provide a fixed force, or a variable force depending on the door angle.

In an embodiment, the controller is configured to operate the motor in a first mode to open the door at the predefined speed, and operate the motor in a second mode to open the door in response to the manual force applied to the door only if the motor output falls to or below the minimum threshold during the opening. In a further embodiment, in the first mode the door is moved from the closed position to the open position at the predefined speed unless the output of the motor reaches the minimum threshold output.

It shall be appreciated that terms such as "a non-transitory memory," "a non-transitory memory medium," and "a non-transitory memory device" refer to a number of types of devices and storage mediums which may be configured to store information, such as data or instructions, readable or executable by a processor or other components of a computer system and that such terms include and encompass a single or unitary device or medium storing such information, multiple devices or media across or among which respective portions of such information are stored, and multiple devices or media across or among which multiple copies of such information are stored.

It shall be appreciated that terms such as "determine," "determined," "determining" and the like when utilized in connection with a control method or process, an electronic control system or controller, electronic controls, or components or operations of the foregoing refer inclusively to a number of acts, configurations, devices, operations, and techniques including, without limitation, calculation or computation of a parameter or value, obtaining a parameter or value from a lookup table or using a lookup operation, receiving parameters or values from a datalink or network communication, receiving an electronic signal (e.g., a voltage, frequency, current, or pulse-width modulation (PWM) signal) indicative of the parameter or value, receiving output of a sensor indicative of the parameter or value, receiving other outputs or inputs indicative of the parameter or value, reading the parameter or value from a memory location on a computer-readable medium, receiving the parameter or value as a run-time parameter, and/or by receiving a parameter or value by which the interpreted parameter can be calculated, and/or by referencing a default value that is interpreted to be the parameter value.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for opening a door using a manual force while the door is operatively coupled to a door operator assembly having a motor, the method comprising:
- initiating movement of the door from a closed position toward an open position;
- operating the motor in a first mode to produce an output force that opens the door at a predefined angular speed in response to initiating the movement;
- determining that the output force of the motor has reached or fallen below a minimum threshold output force associated with the predefined angular speed while opening the door; and
- in response to the determining, operating the motor in a second mode by adjusting the output force of the motor to assist during the opening while the door opens at an opening speed greater than the predefined angular speed.

2. The method of claim 1, wherein the output force of the motor is applied by the motor to the door operator.

3. The method of claim 2, wherein the output force applied by the motor is determined by a motor current.

4. The method of claim 1, wherein after the motor reaches the minimum threshold output force, the opening speed of the door is greater than the predefined angular speed.

5. The method of claim 1, wherein, in response to the determining, the output force of the motor is adjusted so the manual force required to open the door by a user during opening is a constant force.

6. The method of claim 1, wherein, in response to the determining, the output force of the motor is adjusted so the manual force required to open the door by a user during opening follows a predetermined force profile.

7. The method of claim 1, further comprising reverting to operating the motor to open the door at the predefined angular speed in response to the opening speed of the door decreasing to or below the predefined angular speed.

8. The method of claim 1, wherein:
- the motor operates in the first mode to open the door at the predefined angular speed;
- the motor operates in the second mode to open the door in response to the manual force applied to the door; and
- the motor reverts to the first mode in response to the opening speed slowing to the predefined angular speed after operating the motor in the second mode.

9. The method of claim 8, wherein the first mode moves the door from the closed position to the open position at the predefined angular speed unless the output of the motor reaches the minimum threshold output force.

10. A system for opening a door mounted to a frame, the system comprising:
- a door operator connectable between the door and the frame;
- a motor operable to drive the door operator to move the door from a closed position to an open position; and
- a controller connected to the motor, wherein the controller is configured to:
  - control the motor in a first mode to produce an output force that opens the door at a predefined angular speed from the closed position to the open position;
  - determine the output force associated with the predefined angular speed of the motor during opening the door; and
  - in response to the motor output force falling to or below a minimum threshold output force during the opening of the door, control the motor in a second mode so the output force of the motor assists to open the door at an opening speed greater than the predefined angular speed.

11. The system of claim 10, wherein the controller is configured to control the motor to open the door in response to a trigger from at least one of a sensor, an actuator, or a user pushing on the door.

12. The system of claim 10, wherein the door operator includes:
- an arm assembly connectable to at least one of the door and the frame; and
- a drive mechanism that connects the motor to the arm assembly.

13. The system of claim 10, wherein the output force of the motor is applied by the motor to the door operator.

14. The system of claim 13, wherein the output force applied by the motor is determined by a current of the motor.

15. The system of claim 10, wherein the controller is configured to control the output force of the motor so that a manual force that is being applied to open the door at the opening speed greater than the predefined angular speed is constant.

16. The system of claim 10, wherein the controller is configured to control the output force of the motor so that a manual force that is being applied to open the door at the opening speed greater than the predefined angular speed follows a predetermined profile.

17. The system of claim 10, wherein the controller is configured to operate the motor to open the door at the predefined angular speed in response to the opening speed of the door decreasing to or below the predefined angular speed.

18. The system of claim 10, wherein the controller is configured to learn the output force required from the motor at various door angles between the closed position and the open position while opening the door at the predefined angular speed.

19. The system of claim 10, wherein the controller is configured to:

operate the motor in the first mode to open the door at the predefined angular speed;

operate the motor in the second mode to open the door only if the motor output falls to or below the minimum threshold output force during the opening; and operate the motor in the first mode in response to the opening speed slowing to the predefined angular speed while operating in the second mode.

20. The system of claim 19, wherein in the first mode the door is moved from the closed position to the open position at the predefined angular speed unless the output force of the motor reaches the minimum threshold output force.

* * * * *